United States Patent
Star et al.

(10) Patent No.: US 8,681,777 B2
(45) Date of Patent: Mar. 25, 2014

(54) METHOD FOR SHARING RESOURCES OVER A NETWORK

(75) Inventors: Robert Star, Kanata (CA); Christopher James Nason, Kanata (JP)

(73) Assignee: Mitel Networks Corporation, Ottawa, Ontario (CA)

(*) Notice: Subject to any disclaimer, the term of this patent is extended or adjusted under 35 U.S.C. 154(b) by 1607 days.

(21) Appl. No.: 11/675,197

(22) Filed: Feb. 15, 2007

(65) Prior Publication Data

US 2007/0208801 A1     Sep. 6, 2007

(51) Int. Cl.
*H04L 12/28* (2006.01)

(52) U.S. Cl.
USPC .......................................... 370/352; 709/203

(58) Field of Classification Search
USPC .......................................... 370/352; 709/203
See application file for complete search history.

(56) References Cited

U.S. PATENT DOCUMENTS

| | | | |
|---|---|---|---|
| 6,424,700 B1 * | 7/2002 | Thibon et al. | 379/32.04 |
| 6,738,470 B1 | 5/2004 | Aronovitz | |
| 7,613,170 B1 * | 11/2009 | Grabelsky et al. | 370/352 |
| 2003/0061333 A1 * | 3/2003 | Dean et al. | 709/223 |
| 2004/0001433 A1 * | 1/2004 | Gram et al. | 370/229 |
| 2004/0083289 A1 * | 4/2004 | Karger et al. | 709/226 |
| 2004/0114581 A1 * | 6/2004 | Hans et al. | 370/356 |
| 2005/0262238 A1 * | 11/2005 | Reeves et al. | 709/224 |
| 2005/0267955 A1 * | 12/2005 | Neuhaus et al. | 709/223 |
| 2006/0007915 A1 | 1/2006 | Frame | |
| 2007/0086438 A1 * | 4/2007 | Schneider et al. | 370/352 |

* cited by examiner

*Primary Examiner* — Luat Phung

(57) ABSTRACT

In a client/server network, each of a plurality of IP devices has access to a network capability, such as an analog line, when connected to a central server. At least one of the IP devices is in direct communication with a second analog line and grants other IP devices access to the second analog line when the other IP devices lose their connection to the central server.

22 Claims, 4 Drawing Sheets

METHOD FOR SHARING RESOURCES OVER A NETWORK

FIELD OF THE INVENTION

The present invention relates to a method for sharing resources over a network, in particular, sharing capabilities among a plurality of IP devices connected to a central server in the event one or more IP devices is unable to communicate with the server

BACKGROUND OF THE INVENTION

An Intranet Private Branch (iPBX) is a telephony a solution where voice communications are effected over a Local Area Network (LAN) using Voice over IP (VoIP). FIG. 1 illustrates a plurality of IP devices such as phones 1A, 1B, 1C and 1D connected to a central server or iPBX 3 using a LAN 5. The iPBX 3 sets up voice connections between the phones over the LAN 5 (ie. subnet) in order to allow communication therebetween using Real-Time Transport Protocol (RTP) voice packets. The iPBX 3 also allows the phones to communicate over analog phone lines on the Public Switched Telephone Network (PSTN)

It is also known in the art to provide additional network access capabilities to IP phones such as analog line peripherals, Session Initiated Protocol (SIP) support or connection to wireless LAN capability, for example. Analog line peripheral 7 allows IP phone 1D to connect directly to the Public Switched Telephone Network (PSTN) in the event that the phone is unable to communicate with the iPBX 3 due to failure, software upgrade or a LAN infrastructure problem, as described, for example, in commonly-owned United States Patent Application published under 20040190685 on Sep. 30, 2004, and entitled HIGH AVAILABILITY TELEPHONE SET, the contents of which are incorporated herein by reference.

Currently, the only method for providing failover connections to the PSTN for all of the IP phones in a subnet is to provide each IP phone with an analog line peripheral 7, as shown in FIG. 2. Often, this is not a practical solution since the number of IP phones on a subnet may exceed 100. It is therefore desirable to reduce the number of analog line peripherals required for a subnet while maintaining a failover connection for each IP phone.

SUMMARY OF THE INVENTION

In one aspect of the present invention there is provided a client/server network including a plurality of IP devices in communication with a central server. Each of the IP devices is able to access a network capability when connected to said central server and at least one of the plurality of IP devices includes direct access to the network capability so that the IP device may access the network capability when not connected to the central server. The one of the plurality of IP devices grants others of the plurality of IP devices access to the network capability when the others of the plurality. of IP devices are not connected to the central server.

BRIEF DESCRIPTION OF THE DRAWINGS

The invention will be better understood with reference to the following Figures in which like numerals denote like parts and in which.

DETAILED DESCRIPTION OF THE PREFERRED EMBODIMENTS

Figure 1:
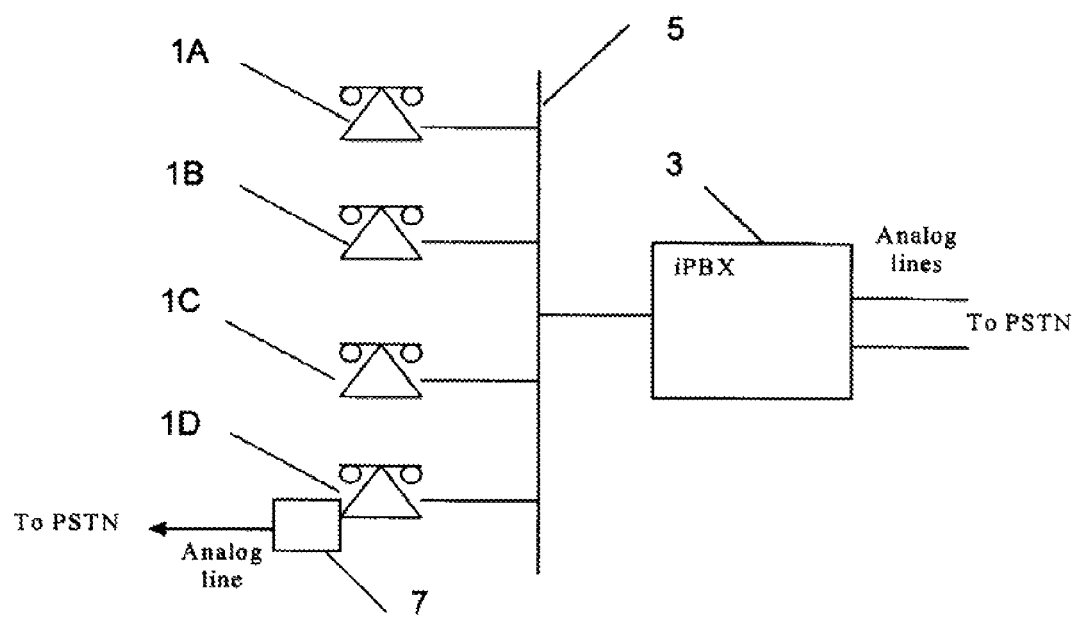
FIG. 1 is a schematic view of a prior art IP phone subnet.
Figure 2:
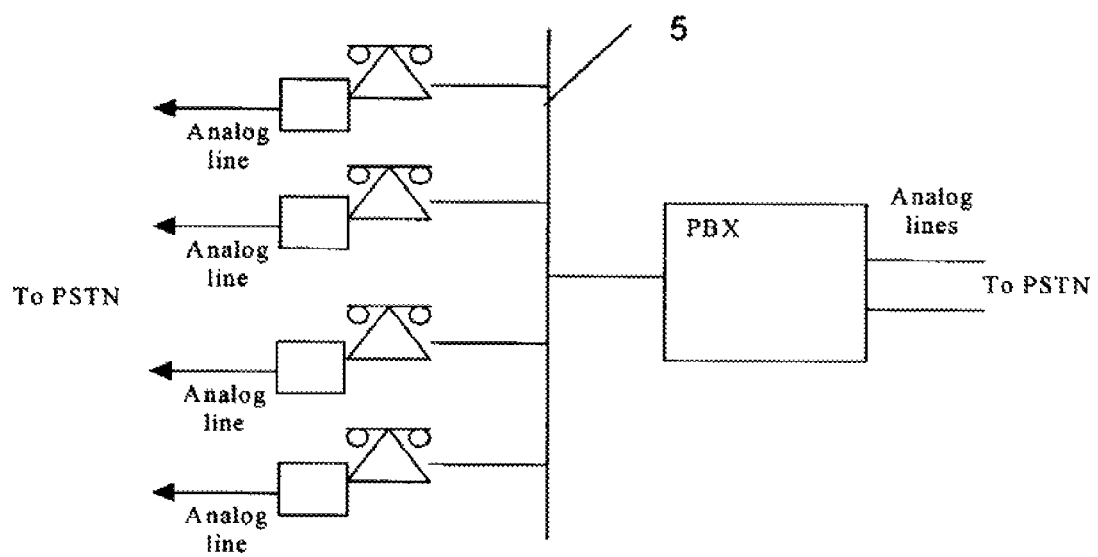
FIG. 2 is a schematic view of another prior art IP phone subnet.

In an embodiment of the present invention, a subnet of stimulus IP phones 1A, 1B, 1C and 1D communicates with a central server, or iPBX, to provide a client/server network, similar to the client/server network shown in FIG. 1. The phones connect to the iPBX using a 3-stage process, which includes Transmission Control Protocol (TCP) connection, Secure Sockets Layer (SSL) connection and registration, as well known in the art. In addition to communicating with the iPBX 3, the IP phones 1A-1D also communicate with one another to advertise their additional network access capabilities.

In contrast to the prior art, IP phones 1A-1D receive configuration information at initialization from Dynamic Host Configuration Protocol (DHCP), manual configuration or from a configuration file and according to the present invention, IP phones, such as 1 D which includes an analog line resource 7 periodically advertise the capabilities they support via a multicast Phone Capabilities message. The Phone Capabilities message includes: the PBX IP address, the phone IP address, the phone MAC address and a capability bit mask. A Phone Capabilities message in which the capability bit mask is equal to 1 indicates that the IP phone (e.g. IP phone 1D) has an analog line resource, such as analog line peripheral 7. All of the other IP phones in the same subnet (e.g. 1A-1C) listen to the multicast messages and create a list of the IP phones that have analog line capability.

The IP phones may also create additional lists to track other IP phone capabilities on the subnet, such as SIP capability, wireless LAN capability, radio capability, cell phone capability, Skype (peer to peer Voice over IP (VoIP)) capability and Integrated Services Digital Network (ISDN) or Transmission Control Protocol/Internet Protocol (TCP/IP) based Voice over IP (VoIP) peer to peer protocol.

The analog line capability list maintained by each IP phone is ordered by arrival time, however, it is indexed using a random sequence. The random sequence is based on the two least significant bytes of the phone's MAC (Media Access Control) address. This indexing method spreads the load on the IP phones having analog line resources during a mass connection failure. It will be appreciated by a person skilled in the art that any suitable indexing method may be used.

Figure 3:
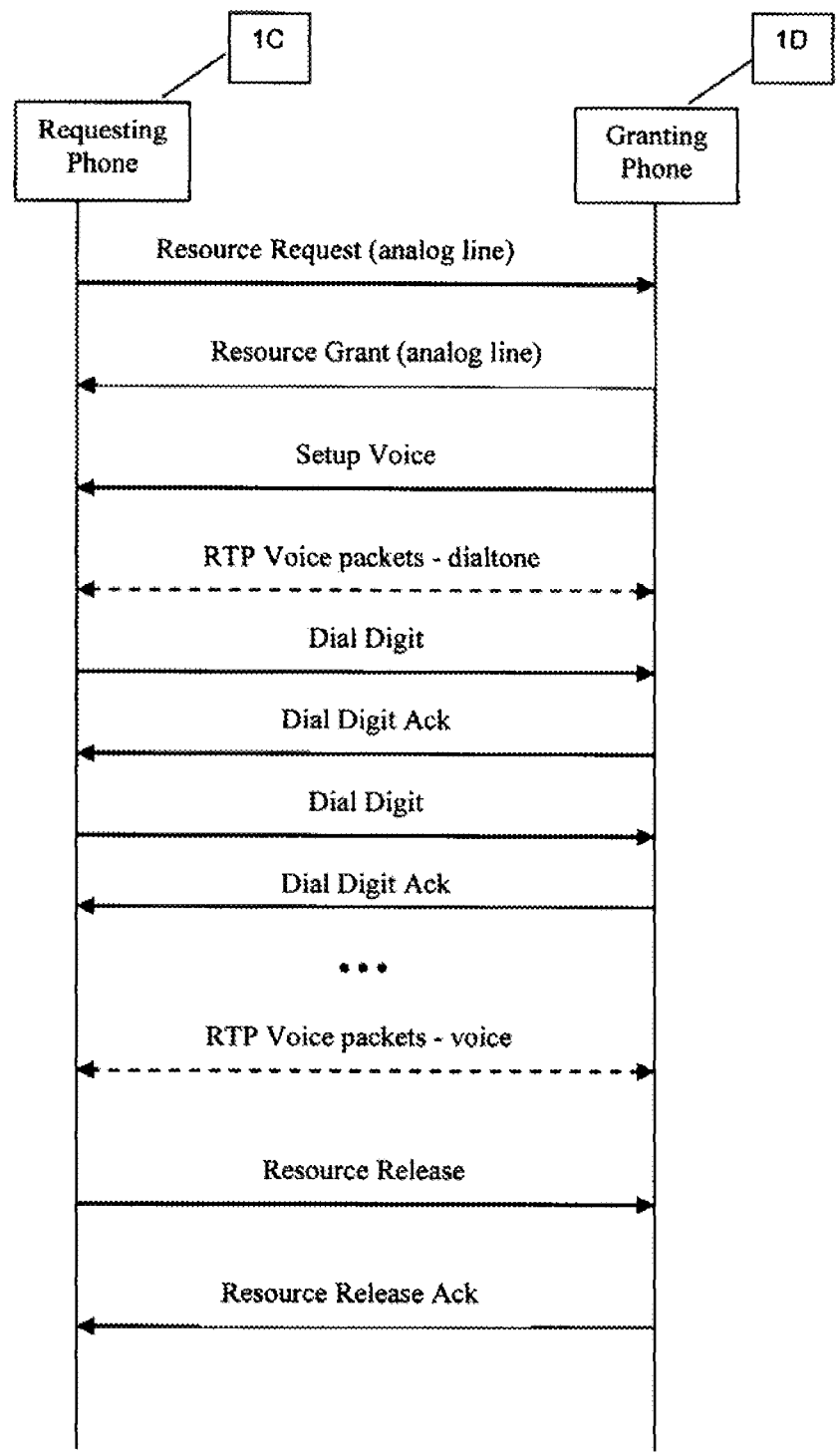
FIG. 3 is a schematic diagram showing communication between a requesting phone and a granting phone according to an embodiment of the present invention.

Referring to FIG. 3, communication between a requesting IP phone (1C), which has lost its connection to the iPBX 3 and needs to make a call, and a granting IP phone (1D), which is a member of the analog line capability list, is generally shown. The requesting IP phone 1C sends a unicast Resource Request message to the granting IP phone 1D requesting use of its analog line 7. The Resource Request message includes the PBX IP address of the active PBX, phone 1C's IP address, phone 1C's MAC address and the capability that phone 1C seeks. The bit mask from the Phone Capabilities message is used for the capability, however, the IP phone may only request one service at a time. The service request is achieved by setting one bit in the bit field to 1 at a time. For example, bit 0, which is the least significant bit, indicates that the service being requested is SIP, bit 1 indicates ISDN, bit 2 indicates analog, bit 3 indicates Skype and bit 4 indicates cellular. Therefore, when the bit field is 00100, an analog line service is being requested. If the granting IP phone 1D accepts the request, it replies with a Resource Grant message, which includes the same parameters as the Resource Request message, and seizes the analog line. By seizing the analog line, the granting IP phone 1D makes the line unavailable for use by itself or other IP phones until the requesting phone has released it.

The granting IP phone 1D then connects the User Datagram Protocol/Real-Time Transport Protocol (UDP/RTP) socket from the requesting IP phone 1C to its analog line 7 and sends a Setup Voice message to the requesting IP phone 1C. The Setup Voice message, which includes the active PBX IP address, phone 1D's IP address and phone 1D's MAC address, informs the requesting IP phone 1C to set up its transducers and prepare its voice socket on the well-known UDP/RTP port. In response, the requesting IP phone turns on its transducers and connects them via a codec to an assigned RTP port, which carries the RTP voice packets.

Once the setup has completed, the voice packets received by the requesting IP phone 1C contain the audio stream of the analog line. This allows a user of the requesting IP phone 1C to hear a dial tone from the PSTN. The user then begins to dial digits. For each digit, a Dial Digit message, which includes the active PBX address, phone 1C's IP address, phone 1C's MAC address and the digit, is sent. The requesting IP phone 1C encodes the Dual Tone Multi-Frequency (DTMF) tones in the RTP stream to its endpoint and the granting phone 1D dials the digits on its analog line. The granting IP phone 1D sends a Dial Digit Ack message following completion of each dial digit message from the requesting IP phone 1C. The Dial Digit Ack is an acknowledgment message that informs the requesting IP phone 1C that the digits have been dialed so that they may be displayed on the requesting IP phone's display. The Dial Digit Ack message includes the active PBX IP address, phone 1D's IP address, phone 1D's MAC address and the digit.

All of the dial digit messages are sent using User Datagram Protocol (UDP) or another suitable protocol. In addition, the messages include a unique token, which allows the receiver to determine if the current dial digit message has been sent for the first time or if the message has been previously sent and is a resend of a previous message. The dialing mechanism used by the granting phone may be dial pulse or DTMF or another suitable dialing mechanism.

Once connected to a dialed party, the user of the requesting IP phone 1C may then engage in a conversation. If the dialed party terminates the call, the user of the requesting IP phone 1C will hear a dial tone from the PSTN indicating that the analog line is still dedicated to the requesting IP phone. The user of the requesting IP phone must release the analog line by hanging up. When the requesting IP phone 1C hangs up, a Resource Release message, which includes the same parameters as the Resource Request message, is sent from the requesting IP phone 1C to the granting IP phone 1D. In response, the granting IP phone 1D disconnects the analog line 7 from the PSTN, closes the UDP/RTP socket and sends a Resource Release Ack message to the requesting IP phone 1C. The Resource Release Ack message, which includes the same parameters as the Resource Release message, acknowledges that the analog line has been released and informs the requesting IP phone 1C to close its transducers and close its UDP/RTP socket.

Figure 4:
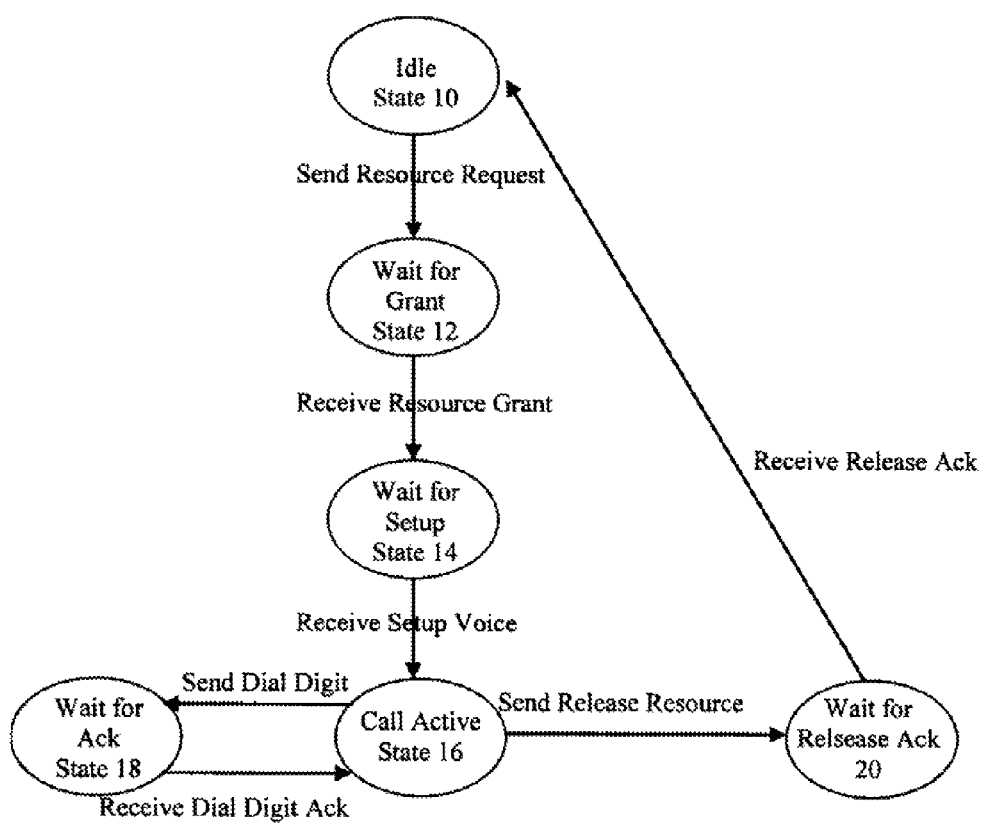
FIG. 4 is a state diagram showing operation of a requesting phone according to the embodiment.

FIG. 4 shows a state diagram for operation of the requesting IP phone 1C according to an embodiment. As shown, the requesting IP phone 1C is in an Idle State 10 until such time as the iPBX 3 is unavailable and the requesting IP phone requires use of an analog line 7. The requesting IP phone 1C sends the Resource Request message to granting IP phone 1D and enters the Wait for Grant State 12. Upon receiving the Resource Grant message from the granting IP phone 1D, the requesting IP phone 1C enters a Wait for Setup State 14. The requesting IP phone 1C receives the Setup Voice message and enters a Call Active State 16. The requesting IP phone 1C sends the Dial Digit message with the first number in a telephone number and enters a Wait for Acknowledgment State 18. When the requesting IP phone 1C receives the Dial Digit Acknowledgment message from the granting IP phone 1D, which indicates that it may display the digit on its display, it sends another Dial Digit message with the second number in the telephone number. The requesting IP phone 1C toggles between the Call Active State 16 and the Wait for Acknowledgment State 18 until the requesting IP phone 1C has dialed all of the digits in the telephone number and the call has been connected. When the requesting IP phone 1C has terminated the call, it sends the Release Resource message to the granting IP phone 1D and enters the Wait for Release Acknowledgment State 20. Once the requesting IP phone 1C receives the Resource Release Acknowledgment message from the granting IP phone 1D, it returns to the Idle State 10 until the next time it loses its connection to the iPBX 3 and requires use of an analog line.

It will be appreciated by a person skilled in the art that phones that have lost their PBX connection will reconnect to the iPBX 3 when possible using the 3-stage process described earlier.

It will be appreciated by a person skilled in the art that the present invention is not limited to IP phones. Any IP device connecting to a central server and requiring failover connection to analog lines may be used including computers, soft phones or other network devices for example.

A specific embodiment of the present invention has been shown and described herein. However, modifications and variations may occur to those skilled in the art. For example, whereas the embodiment sets forth the sharing of an analog line resource among a plurality of IP devices, the principles of the invention may be applied to other network access capabilities such as SIP and wireless LAN capabilities. All such modifications and variations are believed to be within the sphere and scope of the present invention.

What is claimed is:

1. A client/server network comprising:
    a plurality of IP devices in communication with each other and with a central server via a local area network (LAN), each of said plurality of IP devices having access to a network capability when connected to said central server;
    only one of said plurality of IP devices having direct access to said network capability and periodically multicasts a message to the other IP devices of its ability to directly access said network capability;
    said other plurality of IP devices receive said message and create a list comprising an IP address of said only IP device having direct access to said network capability;
    wherein in the event any of said IP devices is unable to communicate with said central server to access said network capability, said IP devices send a resource request message to said IP address of said only IP device from said list requesting access to said network capability, said only IP device having direct access reserves access to said network capability to said first requesting IP device until notified by said requesting IP first device of a release of said access; and wherein each of said lists of IP devices having said network capability is ordered by arrival time and indexed using a random sequence based on least significant bytes of a MAC (Media Access Control) address of said IP devices.

2. A client/server network as claimed in claim 1, wherein said network capability is an analog line.

3. A client/server network as claimed in claim 2, wherein said only one of said plurality of IP devices has direct access to another analog line.

4. A client/server network as claimed in claim 3, wherein said central server includes more than one analog line.

5. A client/server network as claimed in claim 3, wherein said analog line connects to a Public Switched Telephone Network.

6. A client/server network as claimed in claim 1, wherein said network capability is a connection to a wireless LAN.

7. A client/server network as claimed in claim 6, wherein said only one of said plurality of IP devices has direct access to another connection to said wireless LAN.

8. A client/server network as claimed in claim 1, wherein said network capability is a connection to the internet.

9. A client/server network as claimed in claim 8, wherein said only one of said plurality of IP devices has direct access to another connection to the internet.

10. A client/server network as claimed in claim 1, wherein said IP devices are IP phones.

11. The client/server network of claim 1, wherein said message from said only IP device having direct access comprises a central server address, the IP address and MAC address of said only IP device having direct access, and a capability bit mask.

12. The client/server network of claim 1, wherein said central server comprises a private branch exchange (PBX).

13. The client/server of claim 1, wherein reserving access to said network capability to said requesting IP device makes said network capability unavailable for use by any other IP device until said requesting IP device releases said access.

14. A method for providing a network among a plurality of IP phones, said method comprising:
providing said plurality of IP devices in communication with each other and with a central server via a local area network (LAN), each of said plurality of IP devices having access to a network capability through said central server and only one of said plurality of IP devices having direct access to said network capability;
periodically multicasting a message, from said only one of said IP devices having direct access to the other of said IP devices, of its ability to directly access said network capability;
receiving said message at said other IP devices and creating a list comprising an IP address of said only IP device having direct access to said network capability;
in the event any of said IP devices is unable to communicate with said central server to access said network capability,
sending a resource request message to said only IP address of said IP device from said list requesting access to said network capability and said only IP device having direct access reserving access to said network capability to said requesting IP device until notified by said requesting IP device of a release of said access; and
wherein each of said lists of IP devices having said network capability is ordered by arrival time and indexed using a random sequence based on least significant bytes of a MAC (Media Access Control) address of said IP devices.

15. A method according to claim 14, wherein said network capability is an analog line and said only one of said plurality of IP devices has direct access to another analog line.

16. A method to claim 14, wherein said network capability is a connection to a wireless LAN and said only one of said plurality of IP devices has direct access to another connection to said wireless LAN.

17. A method according to claim 14, wherein said network capability is a connection to the internet and said only one of said plurality of IP devices has direct access to another connection to the internet.

18. A method as claimed in claim 14 further comprising:
said only one of said plurality of IP devices sending a grant message to one of said others of said plurality of IP devices in response to said request message.

19. A method as claimed in claim 18, wherein said second analog line is dedicated to said one said others of said plurality of IP devices until said one of said others of said plurality of IP devices sends a release message to said only one of said plurality of IP devices.

20. The method of claim 14, wherein said message from said only IP device having direct access comprises a central server address, the IP address and MAC address of said only IP device having direct access, and a capability bit mask.

21. The method of claim 14, wherein said central server comprises a private branch exchange (PBX).

22. The method of claim 14, wherein reserving access to said network capability to said requesting IP device makes said network capability unavailable for use by any other IP device until said requesting IP device releases said access.

* * * * *